United States Patent [19]

Myers et al.

[11] Patent Number: 4,799,706
[45] Date of Patent: Jan. 24, 1989

[54] DRAWBAR COUPLER

[75] Inventors: Thomas W. Myers, Bettendorf; Earl C. Jacobson, Waterloo, both of Iowa

[73] Assignee: Deere & Company, Moline, Ill.

[21] Appl. No.: 45,108

[22] Filed: May 1, 1987

[51] Int. Cl.⁴ .............................................. B60D 1/12
[52] U.S. Cl. .................................... 280/504; 280/507
[58] Field of Search ............... 280/415 R, 415 A, 478, 280/504, 506, 507, 510, 515; 172/450, 248, 680

[56] References Cited

U.S. PATENT DOCUMENTS

| | | | |
|---|---|---|---|
| 1,145,026 | 7/1915 | Lechtenberg | 280/482 |
| 3,791,456 | 2/1974 | Koch | 280/460 A X |
| 3,794,357 | 2/1974 | Frye | 280/515 |
| 3,795,415 | 3/1974 | Koch et al. | 280/461 A |
| 3,827,724 | 8/1974 | Ackley | 280/511 |
| 3,863,955 | 2/1975 | Muncke et al. | 280/479 A |
| 3,926,456 | 12/1975 | Lundebrek | 280/515 |
| 4,008,905 | 2/1977 | Soteropulos et al. | 280/506 |
| 4,008,906 | 2/1977 | Schaefer et al. | 280/511 |
| 4,434,996 | 3/1984 | Wallace | 280/504 |
| 4,448,439 | 5/1984 | Huffman | 280/504 |

FOREIGN PATENT DOCUMENTS

| | | | |
|---|---|---|---|
| 492300 | 3/1930 | Fed. Rep. of Germany | 280/478 A |
| 990102 | 1/1983 | U.S.S.R. | 280/507 |

Primary Examiner—John J. Love
Assistant Examiner—Mitchell J. Hill

[57] ABSTRACT

A coupler for a pickup drawbar has a removable stud mounted to the end of the drawbar for engaging an implement hitch. A main bracket is mounted to the drawbar between the stud and the work vehicle. A top strap is pivotally mounted in the main bracket and is pivotal between a position engaging the top of the stud and a position removed therefrom to allow the implement hitch access to and from the stud. The top strap is lockable in its closed position engaging the stud and preferably also in its fully open position laying back against the drawbar. The coupler is readily modifiable for use with various implement hitches simply by replacing the stud and top strap.

18 Claims, 3 Drawing Sheets

DRAWBAR COUPLER

BACKGROUND OF THE INVENTION

1. Field of the Invention

The present invention relates to couplers for use with pickup drawbars on work vehicles.

2. Description of the Related Art

Most farm, industrial and other work vehicles are provided with a drawbar for towing implements, trailers and the like. Such drawbars usually are able to swing somewhat from side to side and sometimes are longitudinally adjustable as well, e.g., as taught in U.S. Pat. No. 3,795,415 (Koch et al.). Pickup drawbars which are vertically movable under power sometimes are provided where the implements to be towed are heavy enough that it is difficult to manually lift the implement tongue onto the drawbar. Such pickup drawbars may be straight, as taught in U.S. Pat. No. 3,791,456 (Koch), but often are provided with a hook end, as taught in U.S. Pat. No. 3,863,955 (Muncke et al.).

Whatever the drawbar structure, some coupling mechanism must be provided to attach the implement to the drawbar. There is a wide variety of such mechanisms, the most common of which is a simple drop pin. With such a structure, either the drawbar is provided with two flanges which extend over a ring ended implement tongue or the implement tongue is provided with two flanges which extend over a flat drawbar. A pin then is dropped through holes in the drawbar and implement tongue, and held in place by a cotter pin or spring, as shown in U.S. Pat. No. 4,008,905 (Soteropulos et al.), or by some sort of horizontally pivotal plate, as shown in U.S. Pat. No. 3,794,357 (Frye). U.S. Pat. No. 1,145,026 (Lechtenberg) teaches a further alternative using a spring biased hook rather than a pin. With any of these constructions, excess clearance around the pin or hook allows some degree of movement or "slop" between the implement tongue and the drawbar.

Sometimes, as when a PTO shaft is to be connected between a tractor and an implement, this slop must be avoided. A ball coupler of some form then typically is used. The most common ball couplers provide a ball on the drawbar and a mechanism on the implement tongue to hold the ball. Pivotal movement of the implement tongue around the ball still can occur, but longitudinal movement between the drawbar and the implement tongue is prevented. U.S. Pat. Nos. 3,827,724 (Ackley), 4,008,906 (Schafer et al.) and 4,434,996 (Wallace) provide examples of such ball hitches. In all three of these references, a clamp mechanism of some form is provided to hold the implement tongue on the ball.

Alternatively, the implement tongue can be provided with a captured ball hitch, in which a ball is movably captured within a ring hitch. A hole is provided through the ball, and the hitch can be attached to a drawbar by putting a pin through the hole, as shown in the Soteropulos et al. reference.

Each of the aforementioned coupling techniques has certain disadvantages. Drop in pins and spring-biased hooks do not work well with a pickup drawbar since the implement tongue can simply slide off the drawbar before the pin or hook is dropped in place. A premounted pin such as shown by Soteropulos et al. overcomes this problem, but has the remaining problem that a high amount of stress is placed on the cotter pin if the angle between the work vehicle and the implement is such that the implement tongue is lifted upwards from the drawbar. Finally, the clamp mechanisms used with conventional ball couplers typically have a relatively high number of parts, increasing their complexity.

SUMMARY OF THE INVENTION

Accordingly, it is the purpose of the present invention to overcome the aforementioned disadvantages of the prior art by providing a coupler for a pickup drawbar which is readily adaptable for use with either a ring end implement hitch or a captured ball implement hitch. In addition, the coupler according to the present invention can restrain an implement tongue from moving upwards relative to a drawbar.

The foregoing purposes are accomplished by a coupler with a pin or stud mounted to one end of the drawbar. A bracket is mounted to the drawbar between the stud and the vehicle, with a top strap pivotally mounted in the main bracket. The top strap can pivot between a position engaging the top of the stud and a position spaced away therefrom (preferably all the way back against the drawbar) so that an implement tongue can readily be placed on the stud. The strap can be locked into the closed position on top of the stud and preferably also into a fully open position.

With this construction, the pickup drawbar can be raised under the implement tongue until the stud engages the implement hitch. Once fully engaged, the top strap can be closed over the top of the stud and locked in place, thereby preventing the implement tongue from rising off the stud.

Preferably, the stud and top strap are interchangeable with other studs and top straps, so that the stud and top strap combination best for any particular implement can be provided. For similar reasons, the coupler preferably is provided on a longitudinally extendible drawbar.

The top strap preferably is mounted in the bracket by a removable pivot pin. It further preferably is locked and unlocked by a rotatable pin which can selectively engage or disengage locking surfaces formed in the top strap. When in the locked position, a handle on the locking pin will hold the pivot pin in place, preventing removal thereof.

The stud preferably extends through a hole in the drawbar and is held in place by a keyhole slot in a plate underneath the drawbar.

BRIEF DESCRIPTION OF THE DRAWINGS

The present invention will be described in greater detail with reference to the following figures, in which like reference numerals indicate like elements.

DETAILED DESCRIPTION OF THE PREFERRED EMBODIMENTS

Figure 1:
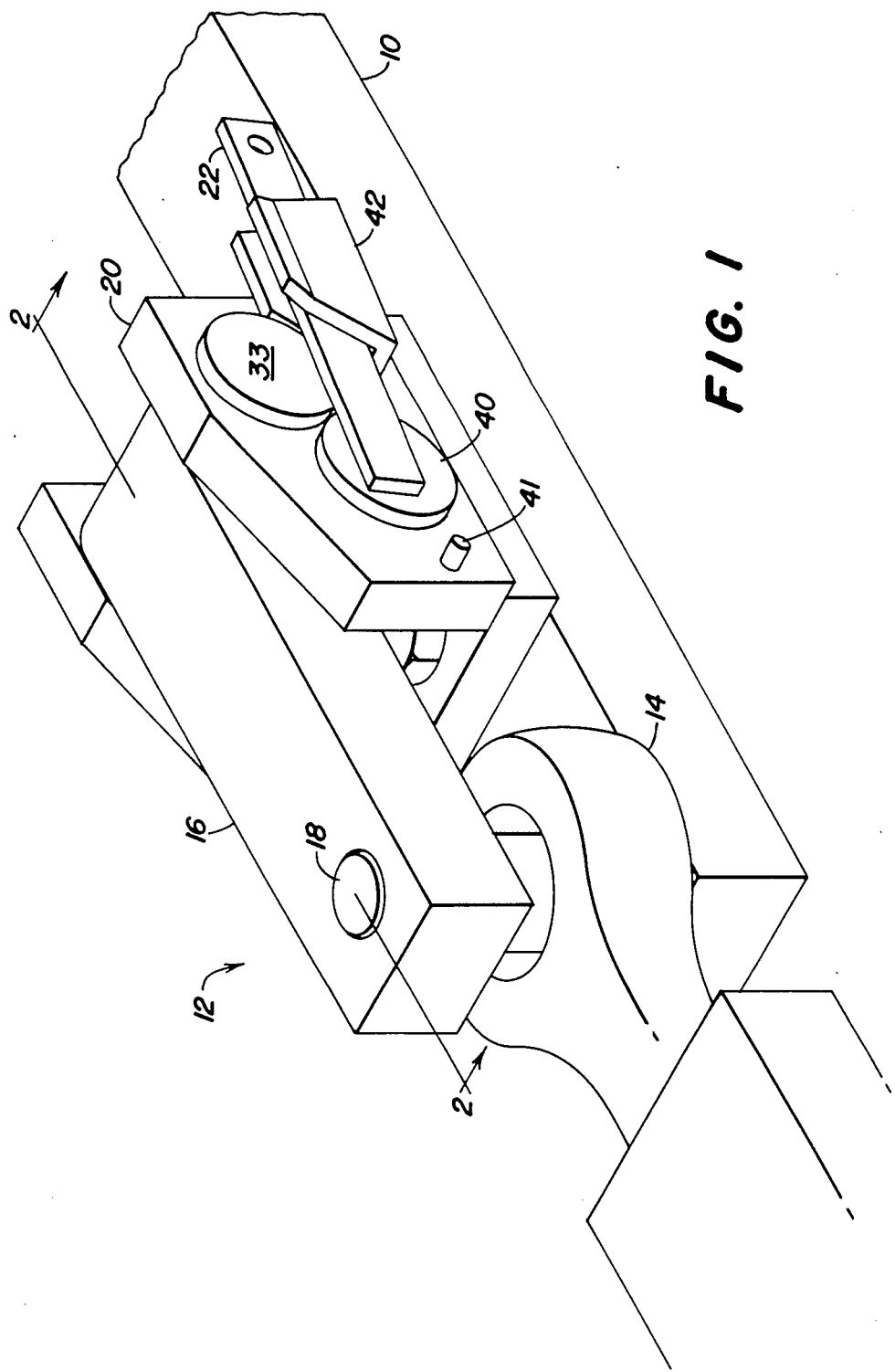
FIG. 1 is a perspective view of a first embodiment of the coupler according to the present invention connected to a ring hitch.

Referring to FIG. 1, a drawbar 10 of a tractor or other work vehicle has a coupler 12 mounted thereon. A ring hitch 14 of an implement, not shown, is connected thereto. A top strap 16 holds the ring hitch 14 on a stud 18 of the coupler 12. The top strap 16 is pivotally mounted in a main bracket 20 mounted to the drawbar 10. The top strap 16 can be locked and unlocked by movement of the handle 22.

Figure 2:
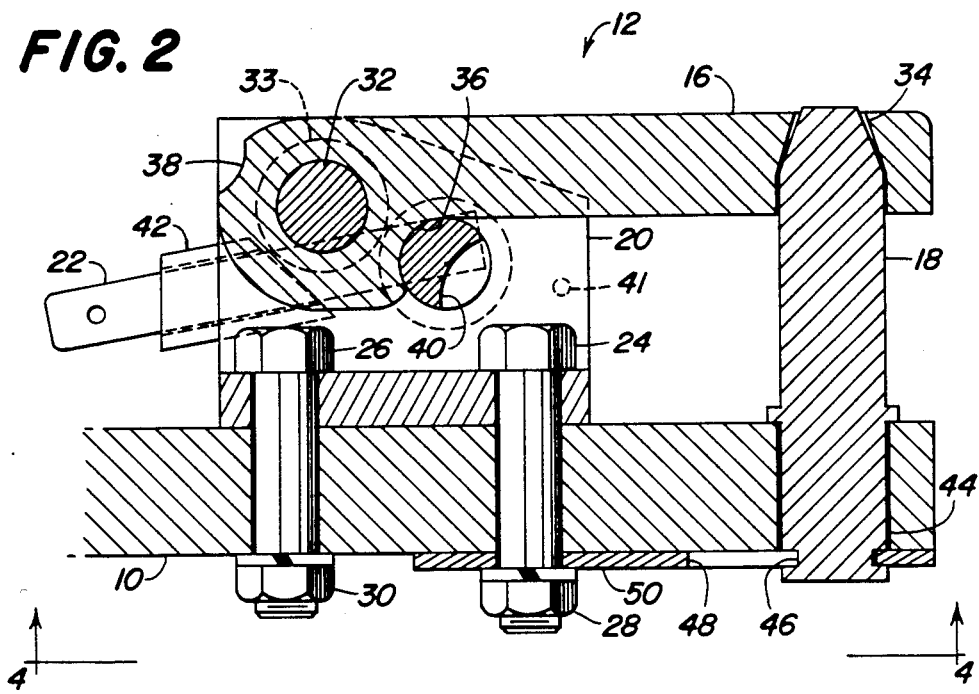
FIG. 2 is a cross section taken along line 2—2 of FIG. 1 of the first embodiment in its closed position.
Figure 3:
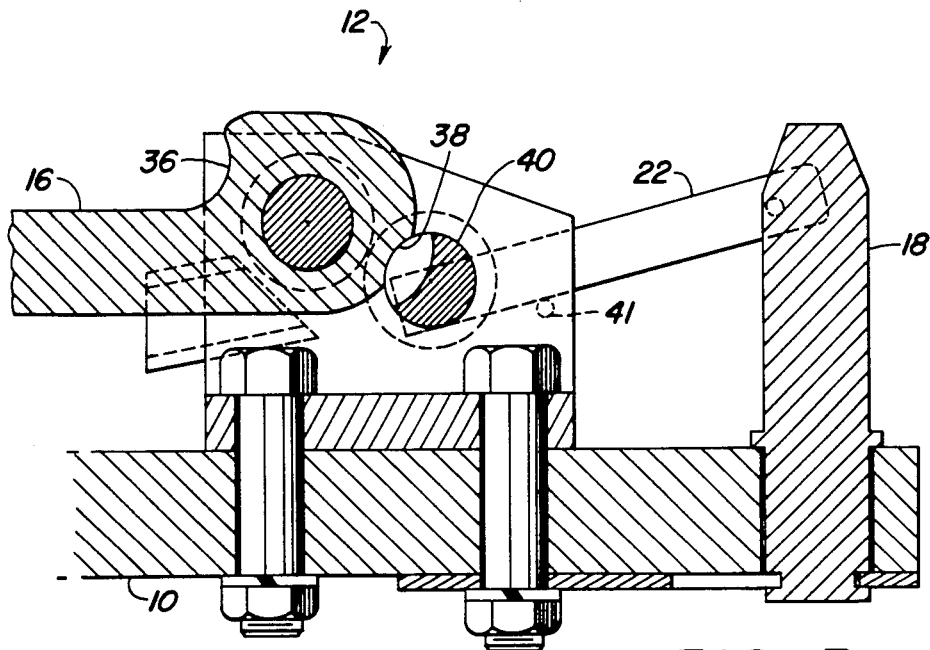
FIG. 3 is a cross section taken along line 2—2 of FIG. 1 of the first embodiment in its open position.

Referring to FIGS. 2 and 3, in which the implement hitch has been omitted for clarity, it can be seen that the main bracket is mounted to the tractor drawbar 10 by bolts 24, 26 and nuts 28, 30.

Top strap 16 is pivotally mounted in the main bracket by a removable pivot pin 32. A hole 34 is provided in top strap 16 to receive the top end of stud 18 when the top strap 16 is in its closed position, shown in FIG. 2.

The top strap 16 further is provided with locking depressions 36, 38 which selectively interact with locking pin 40 to hold the top strap in either its fully closed or its fully open position, as shown in FIGS. 2 and 3, respectively. Locking pin 40 is substantially crescent shaped, at least over the portion thereof adjacent to the top strap 16. Locking pin 40 is connected to and rotatable by handle 22. When the locking pin 40 and handle 22 are in the position shown in FIG. 2, with the outer surface of locking pin 40 engaged with one of the locking depressions 36, 38, the top strap 16 is prevented from pivoting. When the locking pin 40 and handle 22 are rotated to the position shown in FIG. 3, i.e., so that the concave portion of crescent shaped locking pin 40 is facing the top strap 16, the top strap 16 can pivot. Thus, rotation of the handle 2 and locking pin 40 selectively locks the top strap in its fully closed or fully opened positions, or allows rotation thereof. If desired, it would be possible to add additional locking depressions to the surface of the top strap 16 to hold it in any other position. In addition, a device such as pin 41 (best seen in FIG. 1) preferably is provided to prevent the handle 22 from moving past the unlocked position.

Figure 4:
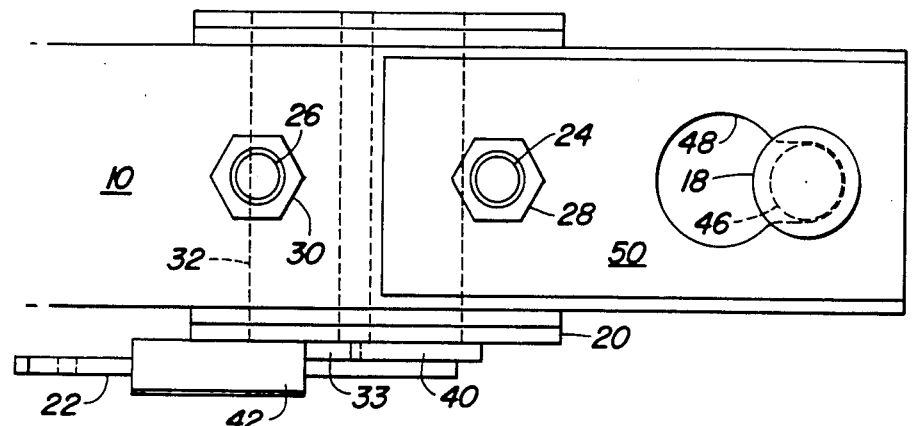
FIG. 4 is a bottom plan view of the first embodiment in its locked position.

As best seen in FIGS. 1 and 4, pivot pin 32 is provided with a flange 33 at the end thereof on the side of the handle 22. When the handle 22 is in the locked position, the flange 33 will prevent removal of the pivot pin 32. A locking bracket 42 is provided to frictionally hold the handle 22 in its locked position.

Referring again to FIGS. 2 and 3, the stud 18 extends through a hole 44 formed in the tractor drawbar 10. The stud has a groove 46 formed in the base thereof which interacts with a keyhole slot 48 (best seen in FIG. 4) in bottom plate 50 to hold the stud in place. The bottom plate 50 in turn is held in place by the rearmost bolt and nut 24, 28 mounting the main bracket 20.

Figure 5:
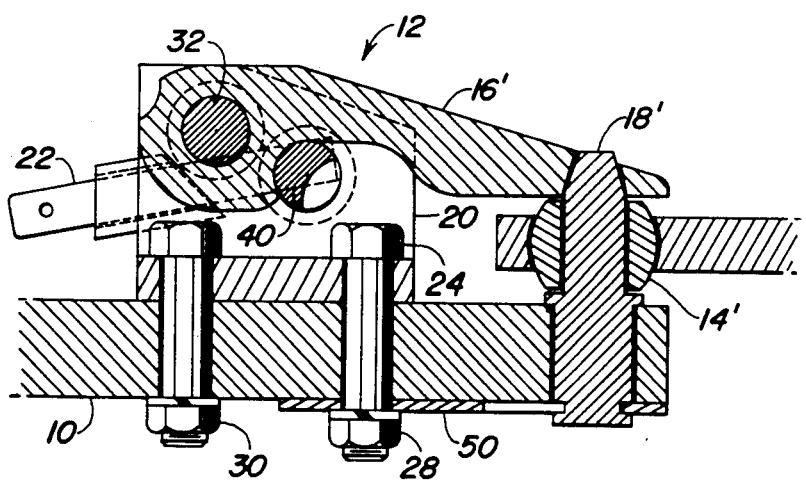
FIG. 5 is a view analogous to FIG. 2 for an alternative embodiment of the coupler according to the present invention.

The spacings between the drawbar 10, ring hitch 14, top strap 16 and stud 18 in this first embodiment are designed to provide a substantial amount of clearance therebetween, so that sufficient play between the drawbar and ring hitch will be allowed. Such clearances are undesirable in some instances, for example, with a captured ball hitch. FIG. 5 illustrates a second embodiment of the present invention using a different stud 18' and different top strap 16' sized to hold a captured ball hitch 14'.

These new elements 16', 18' are substituted easily for the prior elements 16, 18, while leaving all the other elements intact. In particular, to substitute the top strap 16', the handle 22 is rotated to the unlocked position, the pin 32 removed, the top strap 16 removed and replaced with the top strap 16', and the pin 32 replaced. To replace the stud 18, the bolt and nut 24, 28 are removed, the plate 50 slid to allow removal of the stud 18 through the keyhole slot 48 and hole 44 in the drawbar 10, new stud 18' is substituted therefor, the plate 50 is slid back and the bolt and nut 24, 28 replaced. The thus modified coupler is designed to provide minimal clearance between the drawbar 10, captured ball hitch 14', top strap 16' and stud 18'.

As is readily apparent, other top strip and stud combinations can easily be provided for other hitch sizes and types, with the result that the coupler according to the present invention is readily and easily modifiable for use with a large variety of implement hitches.

Various modifications to the embodiments described would readily be apparent to one of ordinary skill in the art. For example, alternative locking mechanisms for the top strap and alternative mechanisms for holding the stud in the drawbar could be provided. In addition, while it has been indicated that the coupler is best used on a longitudinally extendible pickup drawbar, it could be used even on a fixed, non-extendible drawbar. Further, the locking pin could be D-shaped rather than crescent shaped. Accordingly, while the present invention has been described with reference to particular embodiments, it is not intended to be limited thereby, but only by the following claims.

We claim:

1. A drawbar coupler for a work vehicle, comprising:
   a drawbar mounted to the work vehicle;
   a stud mounted on said drawbar;
   a main bracket mounted to said drawbar between said stud and said work vehicle;
   a strap pivotally coupled to said main bracket, said strap being pivotal between an engaged position in close proximity to an end portion of said stud and a disengaged position remote from said end portion; and
   means for selectively locking said strap in said engaged and disengaged positions, said locking means comprising a pin rotatably mounted in said main bracket and having a locking surface selectively engageable with corresponding surfaces on said strap to hold said strap in either of said engaged and disengaged positions and allowing said strap to pivot when said locking surface is disengaged from said corresponding surfaces.

2. The coupler of claim 1, wherein at least a portion of said pin is substantially crescent shaped in cross-section, a convex surface of said crescent serving as said locking surface.

3. The coupler of claim 2, wherein said corresponding surfaces comprise two depressions formed in an outer surface of said strap, said depressions substantially matching said convex surface of said crescent shaped portion of said pin.

4. The coupler of claim 2, wherein a concave surface of said crescent shaped portion of said pin will not engage said strap when said concave surface is adjacent to said strap, thereby allowing said strap to pivot.

5. The coupler of claim 1, wherein said locking surface is selectively engaged with and disengaged from said corresponding surfaces by rotating said pin.

6. The coupler of claim 1, further comprising
   a handle attached to said pin for rotating said pin;

a handle bracket mounted to said main bracket releasably holding said handle in a position such that said locking surface of said pin is engaged with one of said corresponding surfaces of said strap.

7. The coupler of claim 6, wherein said strap is removably mounted to said bracket by a removable pivot pin, said handle being engageable with said pivot pin to prevent removal of said pivot pin from said main bracket when said handle is held in said handle bracket.

8. A drawbar coupler for a work vehicle, comprising:
a drawbar mounted to the work vehicle;
a stud mounted on said drawbar;
a main bracket mounted to said drawbar between said stud and said work vehicle;
a strap pivotally coupled to said main bracket, said strap being pivotal between an engaged position in close proximity to an end portion of said stud and a disengaged position remote from said end portion, said strap having a hole formed therein near an end thereof and said stud being received by said hole when said strap is in said engaged position; and
means for selectively locking said strap in said engaged and disengaged positions.

9. The coupler of claim 8, wherein said strap is removably mounted to said main bracket and said stud is removably mounted to said drawbar.

10. The coupler of claim 9, further comprising:
a hole formed in an end of said drawbar in which said stud is removably mounted; and
a plate removably mounted to said drawbar and having a keyhole slot for releasably holding said stud in said hole.

11. The coupler of claim 9, further comprising a second strap and a second stud selectively mountable to said drawbar in place of said first strap and first stud, said first strap and stud being suitably sized to couple with a first type of hitch and said second strap and stud being suitably sized to couple with a second type of hitch.

12. The coupler of claim 8, wherein said strap rests substantially parallel to said drawbar between said main bracket and said work vehicle when said strap is locked in said disengaged position.

13. A pickup drawbar coupler for a work vehicle, comprising:
a pickup drawbar mounted to the rear end of the work vehicle;
a stud mounted near a rear end of said drawbar;
a main bracket mounted to a top of said drawbar between said stud and said work vehicle;
a top strap pivotally mounted to said main bracket, said strap being pivotal between a closed position in close proximity to a top portion of said stud and a fully open position remote from said top portion; and
a crescent shaped pin rotatably mounted in said main basket, said pin being rotatable between a locked position wherein a convex surface of said pin is adjacent to and engaged with said top strap to prevent said top strap from pivoting and an unlocked position wherein a concave surface of the pin is adjacent to but disengaged from said top strap to allow said top strap to pivot.

14. The coupler of claim 13, wherein said pin engages corresponding depressions in an outer surface of said top strap when, in said locked position.

15. The coupler of claim 13, wherein said stud and said top strap are removably mounted to said drawbar and said main bracket, respectively.

16. The coupler of claim 15, further comprising:
a hole formed in said drawbar near said rear end thereof and through which said stud extends; and
a plate removably mounted to a bottom of said drawbar and having a keyhole slot formed therein, said stud being engageable with said keyhole slot and held in said hole thereby when said plate is mounted to said drawbar.

17. The coupler of claim 15, further comprising a second stud and a second top strap for mounting to said drawbar and said bracket in place of said first stud and said first top strap, said first stud and top strap being sized to engage a first type of implement hitch and said second stud and top strap being sized to engage a second type of implement hitch.

18. The coupler of claim 13, wherein said top strap has a hole formed near one end thereof, said stud being engaged in said hole when said top strap is in said closed position.

* * * * *